US005442500A

United States Patent [19]
Hidano et al.

[11] Patent Number: 5,442,500
[45] Date of Patent: Aug. 15, 1995

[54] CARTRIDGE LIBRARY APPARATUS FOR HANDLING A NUMBER OF CARTRIDGES IN ONE OPERATION

[75] Inventors: Takao Hidano; Masatoshi Ishikawa, both of Odawara, Japan

[73] Assignee: Hitachi, Ltd., Tokyo, Japan

[21] Appl. No.: 184,832

[22] Filed: Jan. 21, 1994

Related U.S. Application Data

[63] Continuation-in-part of Ser. No. 998,472, Dec. 30, 1992, abandoned.

[30] Foreign Application Priority Data

Jan. 9, 1992 [JP] Japan .................................. 4-2040
Jan. 22, 1993 [JP] Japan .................................. 5-009208

[51] Int. Cl.6 ............................................ G11B 15/68
[52] U.S. Cl. .................................. 360/22; 369/34
[58] Field of Search ............................ 360/92; 369/34

[56] References Cited

U.S. PATENT DOCUMENTS

5,247,406 9/1993 Apple ..................................... 360/92

*Primary Examiner*—A. J. Heinz
*Attorney, Agent, or Firm*—Meltzer, Lippe, Goldstein et al.

[57] ABSTRACT

A cartridge library apparatus adapted to large number of cartridges in one operation, comprising magazines each of which can be loaded with the large number of cartridges, and a magazine rack in which the magazine is detachably accommodated. The magazine is provided with erroneous insertion restraint portions each of which prevents the corresponding cartridge from completely entering the cartridge accommodation space of the magazine when the cartridge lying in an erroneous direction with respect to the magazine is intended to be inserted into the space.

8 Claims, 12 Drawing Sheets

F I G. 1
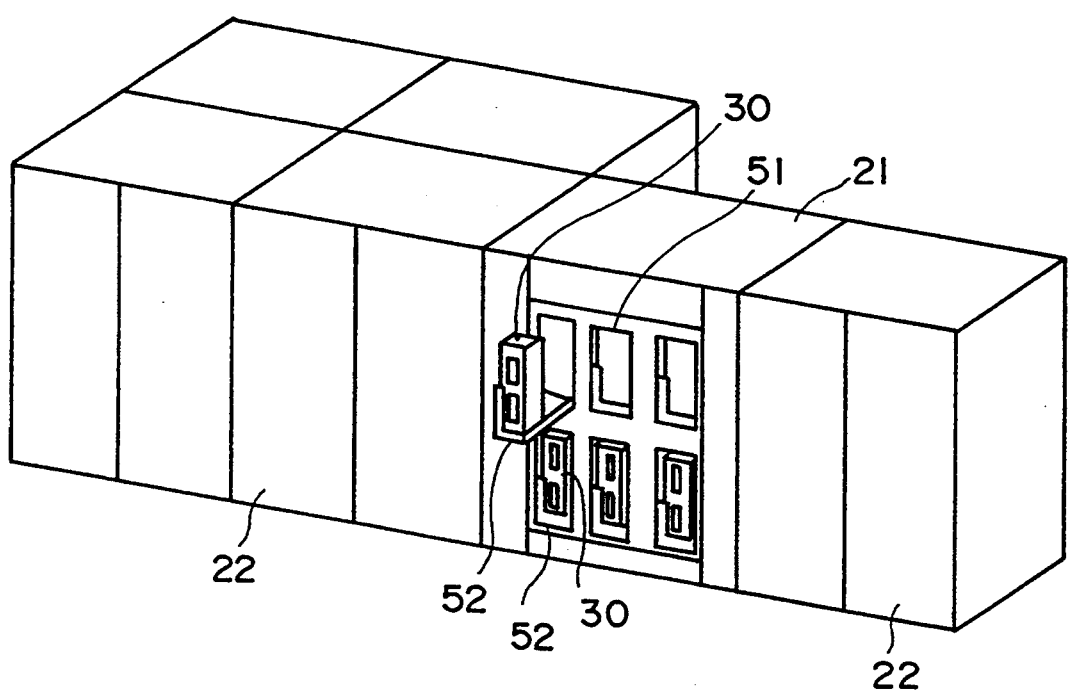

CARTRIDGE LIBRARY APPARATUS FOR HANDLING A NUMBER OF CARTRIDGES IN ONE OPERATION

This application is a continuation-in-part of U.S. application Ser. No. 07/998,472 filed on Dec. 30, 1992, now abandoned entitled "CARTRIDGE LIBRARY APPARATUS" which is incorporated herein by reference.

BACKGROUND OF THE INVENTION

1. Field of the Invention

The present invention relates to a cartridge library apparatus suitable for use in handling a number of cartridges of magnetic tape in one operation.

2. Related Art

While various kinds of external memory sub-systems are known for implementation in information processing systems such as general-purpose electronic computer systems, a typical example is a cartridge library apparatus that comprises racks accommodating a number of cartridges of magnetic tape (which are hereunder sometimes referred to simply as "cartridges"), a magnetic tape drive unit and a transport mechanism such as an accessor robot for performing necessary jobs such as transport of cartridges between one of those racks and the drive unit and which is capable of providing a large storage capacity.

An example of the means for enabling cartridges to be either unloaded from the cartridge library apparatus or loaded thereinto is described in Japanese Patent Application Publication (KOKAI) No. 80847/1981. The cartridge transfer mechanism described in that patent application comprises a disk-shaped member that has one side facing racks and the other side exposed to the outside, with a plurality of cartridge-accommodating cylinders being arranged rotatably and radially on the disk-shaped member. With the aid of those cylinders, the cartridges can individually be loaded onto or unloaded from the racks.

The user of the prior art library apparatus is capable of loading it with only one cartridge at a time and when loading a high volume of cartridges into the apparatus or unloading them for such purposes as processing files on a monthly or yearly basis, the user has to be involved so many times in getting the job done that not only does his workload increase but also the time required to complete the job will be prolonged.

SUMMARY OF THE INVENTION

An object, therefore, of the present invention is to provide a cartridge library apparatus that enables a number of cartridges to be loaded or unloaded at a time, thereby reducing the workload of the operator who is handling many cartridges.

A cartridge library apparatus for accomplishing the object consists in comprising:

magazines each of which can be loaded with a plurality of cartridges;

each of the magazines being formed with a cartridge accommodation space in which the plurality of cartridges are accommodated, and a cartridge insertion/ejection opening through which the cartridges are put into and out of the cartridge accommodation space outside the magazine, and being provided with erroneous insertion restraint portions each of which allows the corresponding cartridge to be completely accommodated in the cartridge accommodation space when the cartridge is intended to be inserted from the one face of the container in the case of inserting the cartridge into the cartridge accommodation space through the cartridge insertion/ejection opening, whereas it prevents the cartridge from being completely inserted into the cartridge accommodation space when the cartridge is intended to be inserted from any position thereof other than the one face of the container;

at least one of the racks constructing a magazine rack which accommodates the magazines therein, and which is formed with cartridge insertion/ejection ports for putting the cartridges into and out of the magazine rack, on its side near the transport mechanism, and magazine holes for, at least, inserting the magazines into the magazine rack from outside, on its side opposite the cartridge insertion/ejection ports.

Here, the magazine rack of the cartridge library apparatus should preferably include covers, each of which is switchable between a closed state shutting up the corresponding magazine hole and an open state allowing the magazine to be inserted through the magazine hole. Further, in the case where such covers are disposed, the magazine rack should preferably include latch mechanisms each of which holds the corresponding cover in the closed state, and each of which releases the holding of the closed state of the cover when the magazine is intended to be inserted through the magazine hole in the state that the cartridge is completely accommodated in the cartridge accommodation space of the magazine, whereas it does not release the holding of the closed state of the cover even when the magazine is intended to be inserted through the magazine hole in the state that the cartridge is not completely accommodated in the accommodation space of the magazine.

Also, the magazine of the cartridge library apparatus may well include cartridge lock mechanisms each of which constrains the corresponding cartridge in the cartridge accommodation space so as to prevent the cartridge from coming out of the magazine hole, in the state that the cartridge is completely accommodated in the cartridge accommodation space; while the magazine rack may well include unlocking mechanisms each of which releases the constraint of the cartridge by the cartridge lock mechanism when the magazine has been accommodated in the magazine rack.

The operation of accommodating the cartridges into the rack proceeds in such a way that, after the large number of cartridges have been loaded into each of the magazines, the magazine loaded with the cartridges is carried to the magazine rack and is set therein through the magazine hole. Since, in this manner, the large number of cartridges can be handled in one operation, the labor of the operator of the cartridge library apparatus can be relieved.

When the insertion direction of the cartridge is erroneous in loading the cartridge into the magazine, the erroneous insertion restraint portion prevents the cartridge from being completely accommodated in the magazine and projects the inserted cartridge from the magazine more than the other cartridges. Accordingly, the operator can check the inserted state of the cartridge before setting the magazine in the rack. Besides, when the magazine loaded with the cartridges has been set in the rack, the latch mechanism of the cover is released by the setting of the magazine, and the cover arranged so as to shut up the magazine hole of the rack retreats, thereby permitting the transport mechanism to directly access any of the cartridges. However, if any of the cartridges projects from the magazine due to the insertion thereof into the magazine in the erroneous direction, the latch mechanism of the cover is not released even when the operator tries to put the magazine into the rack. Therefore, the cover is not opened, and the magazine cannot be accommodated in the rack. Accordingly, the error of the insertion direction of the cartridge can be ensured also on this occasion.

In the case where the cartridge library apparatus is furnished with the cartridge detection mechanism, the presence or absence of at least one cartridge can be automatically discriminated. Therefore, the operation of loading the cartridges into the magazine can be carried out more perfectly. Further, in the case of the cartridge library apparatus furnished with the cartridge lock mechanisms, when the cartridge has been loaded into the magazine, the lock mechanism hinders the cartridge from slipping out of the magazine. Thus, even when the magazine is subjected to mechanical shocked during the transportation thereof to the rack by way of example, the cartridges do not fall from the magazine, and hence, they do not break or become damaged.

BRIEF DESCRIPTION OF THE DRAWINGS

FIG. 1 is a general perspective view of a cartridge library apparatus in an embodiment of the present invention;

PREFERRED EMBODIMENT OF THE INVENTION

Figure 2:
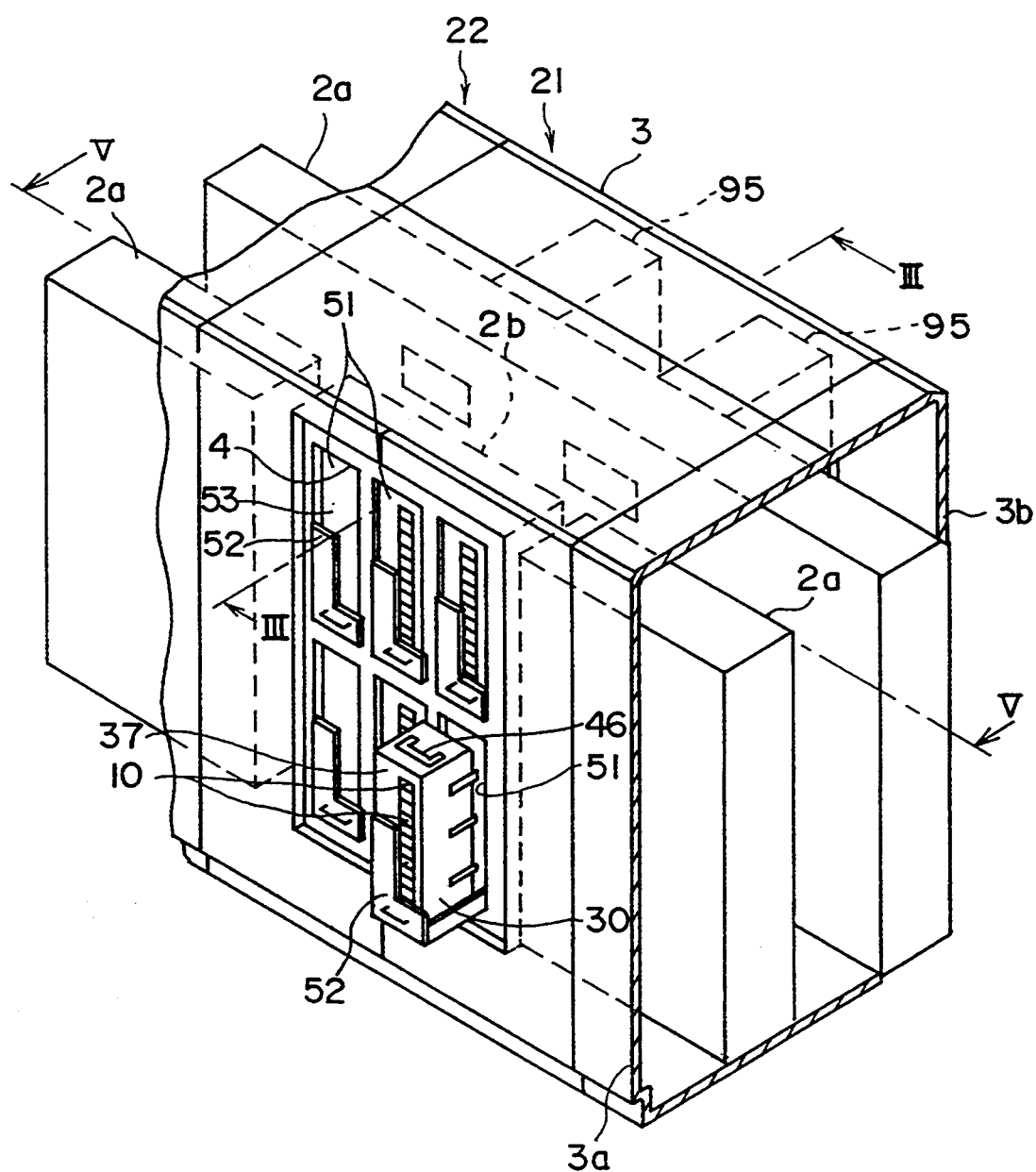
FIG. 2 is a perspective view, partially broken away, showing the cartridge library apparatus of the embodiment.

An embodiment of a cartridge library apparatus according to the present invention will now be described with reference to the accompanying drawings.

The cartridge library apparatus is directed toward cartridges each of which has a built-in magnetic tape. The cartridge has only one reel enveloped in a container and uses the tape as a storage medium as in, for example, "3480 Cartridge Tape" manufactured by International Business Machines Corporation in U.S.A. or "STK Cartridge Tape" manufactured by Storage Technology Corporation in U.S.A. The cartridge of the specified type is generally as indicated by reference numeral 10 in FIG. 6, and the container 11 is in the shape of a thin rectangular parallelepiped. The container 11 is formed with a slant or cutout 15 of, for example, 45° between a rear wall 13 and a side wall 14 contiguous thereto. A front wall 12 opposite to the rear wall 13 is formed with a tape slot. The tape is wound round the reel, and a lead block is attached to one end of the tape. Numeral 16 designates another side wall.

Figure 3:
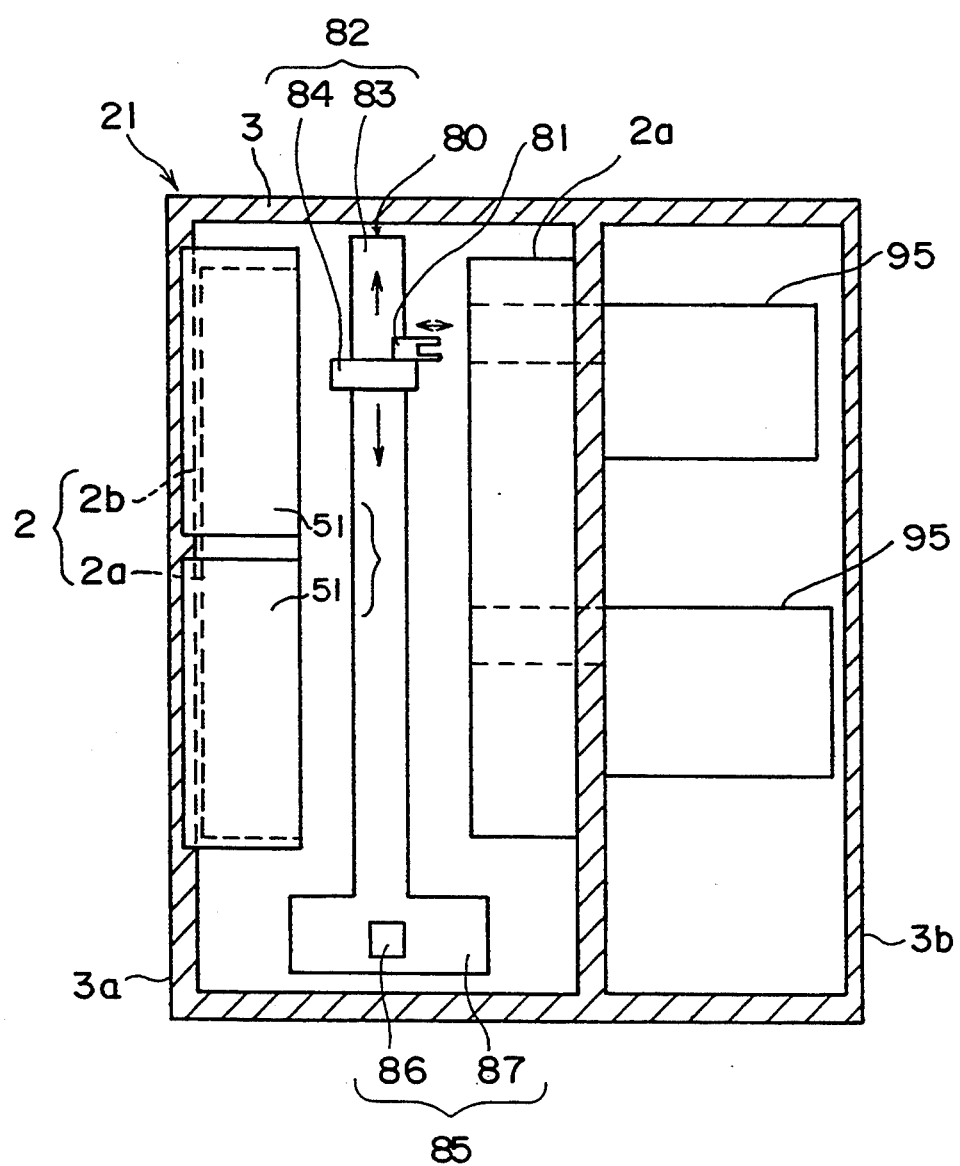
FIG. 3 is a sectional view taken along line III—III which is indicated in FIG. 2.

As shown in FIG. 1, the cartridge library apparatus of this embodiment has a main unit 21 and extension units 22. As shown in FIGS. 2 and 3, the main unit 21 comprises racks 2 (including 2a and 2b) in each of which the plurality of cartridges 10, 10, . . . are accommodated, magnetic tape drive units 95 which include magnetic tape drivers for reading information out of the cartridges 10 or/and writing information thereinto, a transport device 80 which transports the cartridge 10 between the rack 2 and the magnetic tape drive unit 95, a controller (not shown) which controls the operation of the transport device 80, and a housing 3 which encloses all the aforementioned constituent elements therein.

Figure 5:
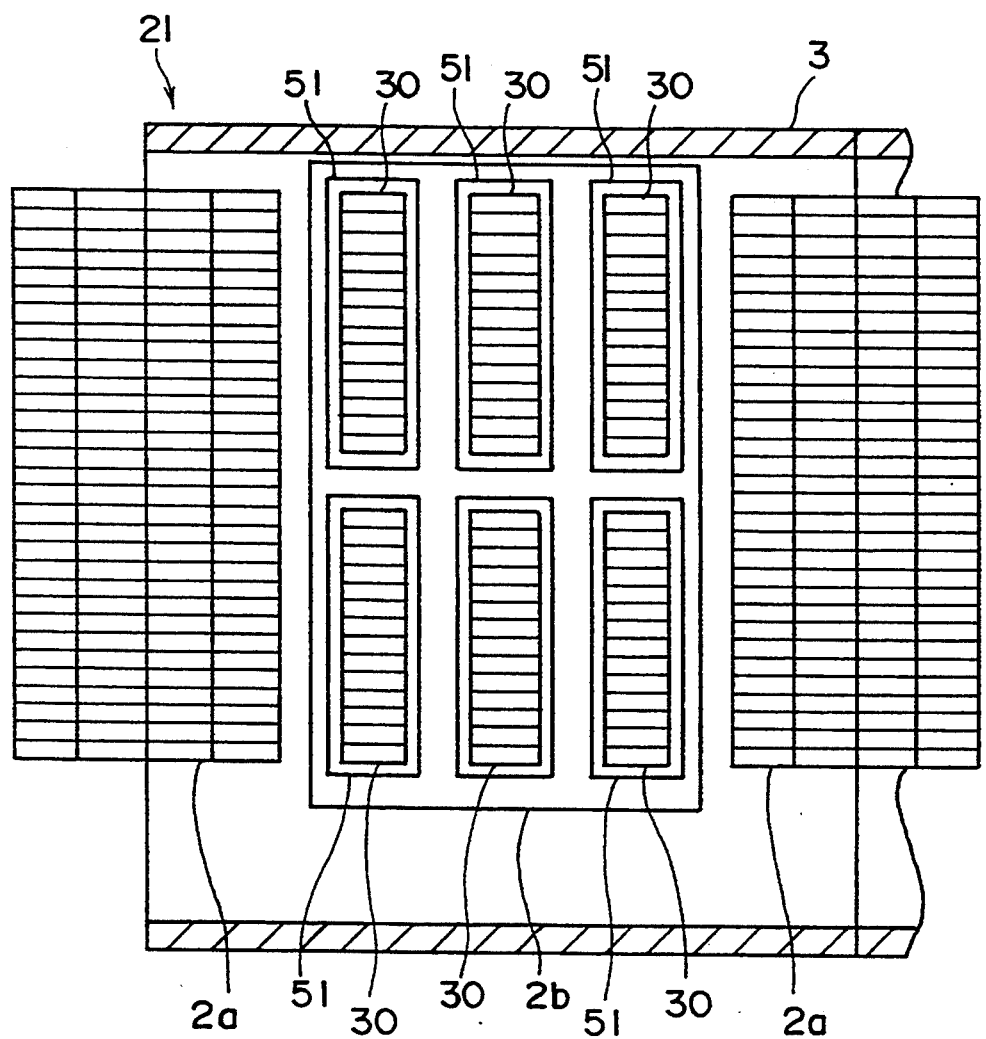
FIG. 5 is a sectional view taken along line V—V which is indicated in FIG. 2.

As shown in FIG. 5, the racks 2 include a magazine rack 2b which accommodates therein magazines 30 each capable of loading the plurality of cartridges 10 in a vertically-arrayed state, and main racks 2a each of which accommodates therein the cartridges 10 not loaded in the magazines 30. The magazine rack 2b is arranged at the front central part of the housing 3, while the main racks 2a, 2a, 2a are respectively arranged on both sides of the magazine rack 2b and on the deep side of the main unit 21 with respect to the magazine rack 2b (refer also to FIG. 2). The magazine rack 2b can accommodate a total number of six magazines 30 owing to an array which consists of two stages in the vertical direction of this rack 2b and three columns in the horizontal direction thereof. The magazine rack 2b has six magazine accommodation portions or spaces 51, 51, . . . into which the magazines 30 can be inserted from the side of the front face 3a of the housing 3 toward the side of the rear face 3b thereof.

Figure 4:
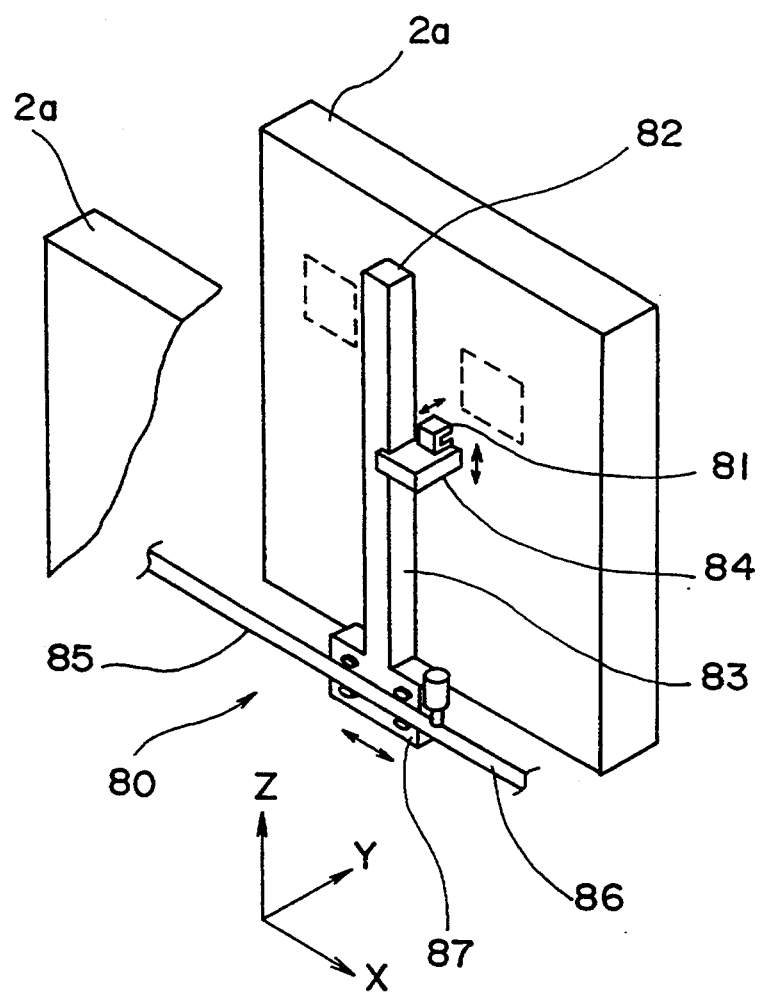
FIG. 4 is a perspective view of a transport device which is included in the embodiment.

The magnetic tape drive units 95 are disposed on the deep side of the main unit 21. Besides, the transport device 80 is interposed between the racks 2 and the magnetic tape drive units 95. As shown in FIGS. 3 and 4, the transport device 80 includes a picker 81 which is movable horizontally (in a Y-direction) while picking the cartridge 10, an elevation mechanism 82 which moves the picker 81 vertically (in a Z-direction), and a horizontal movement mechanism 85 which moves the elevation mechanism 82 bearing the picker 81, horizontally (in an X-direction). The elevation mechanism 82 includes a guide shaft 83 which extends in the vertical direction (the Z-direction), and a slide base 84 which moves vertically along the guide shaft 83. The picker 81 is carried on the slide base 84. The horizontal movement mechanism 85 includes a guide rail 86 which extends in the horizontal direction (the X-direction), and a slide base 87 which supports the elevation mechanism 82 and which moves horizontally along the guide rail 86. Incidentally, the guide rail 86 extends into the extension units 22 adjoining the main unit 21.

As shown in FIG. 5, the arrayal pitch between the adjacent ones of the cartridges 10 to be loaded in each magazine 30 is set equal to that between the adjacent ones of the cartridges 10 to be accommodated in the main racks 2a, 2a which adjoin the magazine rack 2b. Besides, as shown in FIG. 3, the magazine rack 2b is so constructed that the access plane thereof confronting the side of the transport device 80 is even with the access planes of the main racks 2a, 2a confronting the same. Accordingly, the transport device 80 can deal with the cartridges 10 equally without especially distinguishing the cartridge 10 loaded in the magazine 30 inserted in the magazine rack 2b and the cartridge 10 accommodated in the main rack 2a, so that the operation control of the transport device 80 can be performed with ease.

Figure 6:
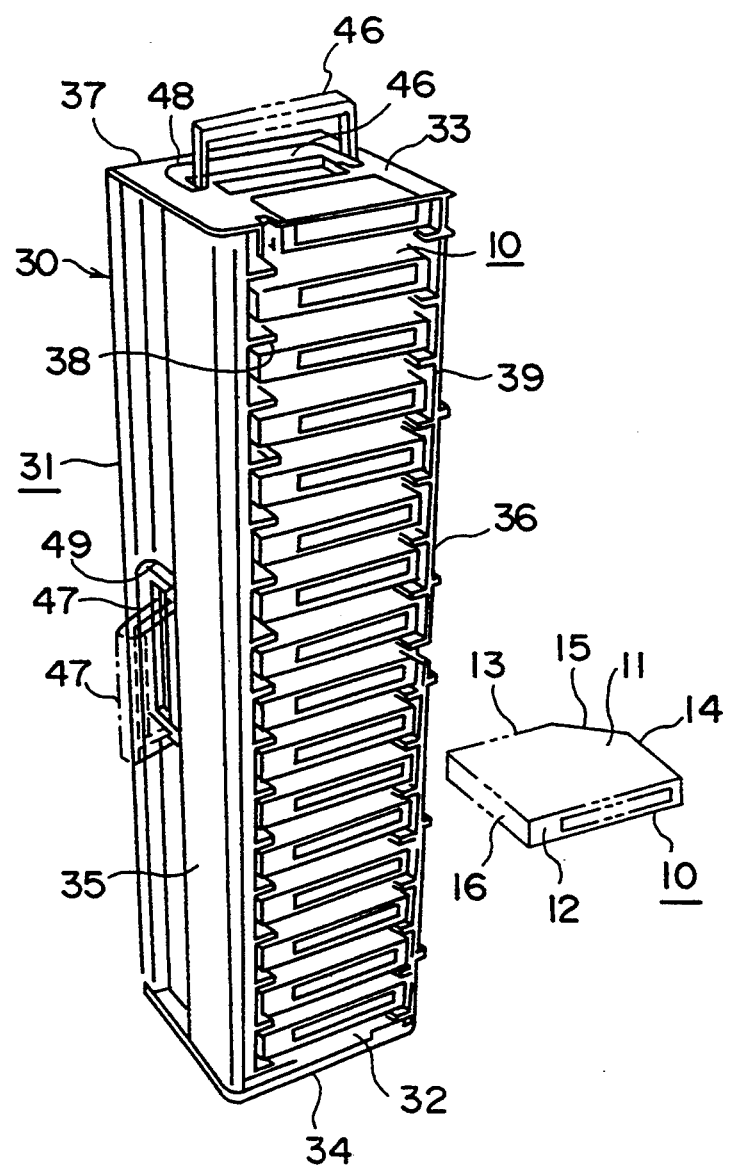
FIG. 6 is a general perspective view of a magazine which is included in the embodiment.
Figure 7:
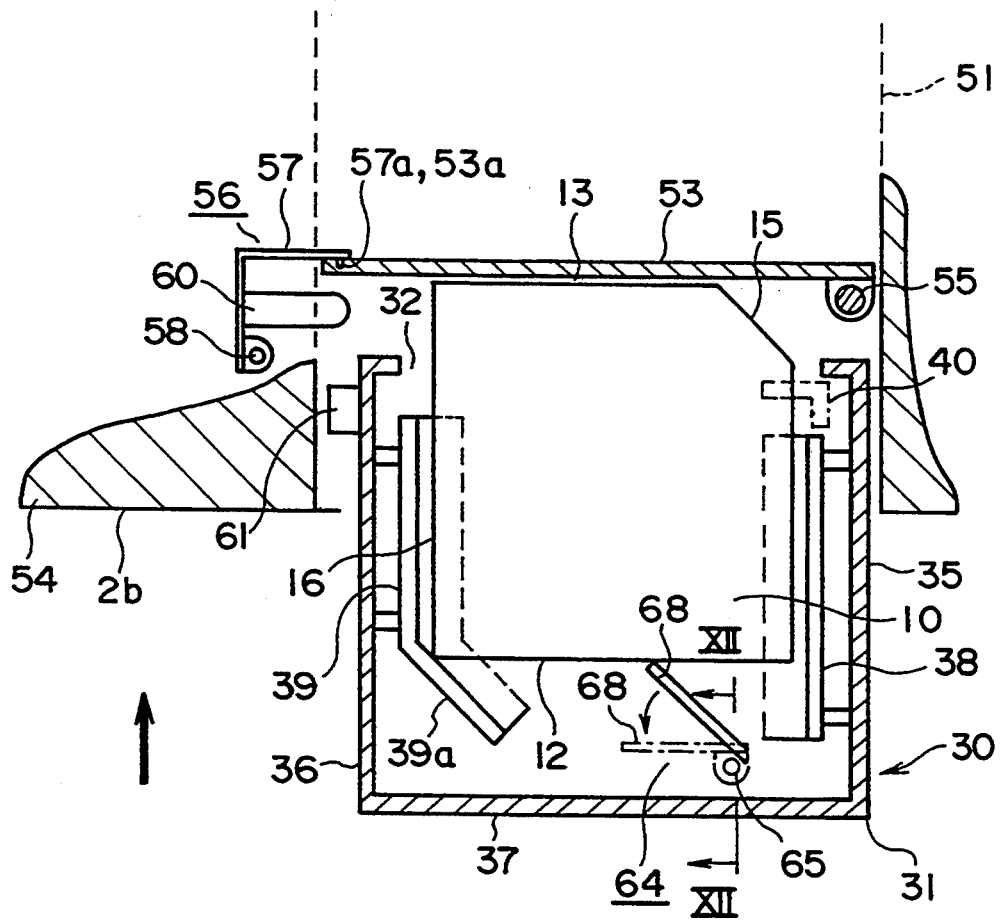
FIG. 7 is a sectional view of the essential portions of the cartridge library apparatus of the embodiment showing the state of the apparatus immediately before the magazine loaded with cartridges in an erroneous direction is set in a magazine rack.

FIG. 6 illustrates the details of the magazine 30. This magazine 30 includes its body 31 which has a space for accommodating the cartridges 10. The magazine body 31 is in the shape of a hollow box whose front face 32 is open and which has a top wall 33, a bottom wall 34, side walls 35, 36 and a rear wall 37. A large number of brackets 38 and 39 are respectively mounted on the inner surfaces of the side walls 35 and 36. By the way, as seen from FIG. 2, in inserting the magazine 30 into the magazine rack 2b, the opening (cartridge insertion/ejection opening) 32 confronts the deep side of the main unit 21, that is, the rear wall 37 confronts the side of the front face 3a of the main unit 21 (the housing 3). The brackets 38 disposed on one side wall 35 are respectively even with the corresponding brackets 39 disposed on the other side wall 36. The interval between a pair of even brackets 38, 39 and another pair of brackets 38, 39 adjoining the former pair above or below is substantially equal to the thickness of the cartridge 10. In other words, a subspace for accommodating one cartridge is formed between the pair of even brackets 38 and 39 in the magazine body 31, and such subspaces constitute the cartridge accommodation space of the magazine 30. As shown in FIG. 7, each of the brackets 38, 39 has an L-shaped cross section and is fixed to the corresponding one of the side walls 35, 36 of the magazine body 31 through spacers. As seen from FIG. 6, the cartridge 10 is loaded into the magazine 30 in such a way that it is inserted between the pairing brackets 38 and 39 through the insertion/ejection opening 32 of the magazine body 31 in the state in which the front wall 12 having the tape slot faces outwards, and that both the side edges thereof are supported by the brackets 38 and 39. The magazine 30 is thus loaded with a number of, for example, fifteen, the cartridges 10.

Figure 8:
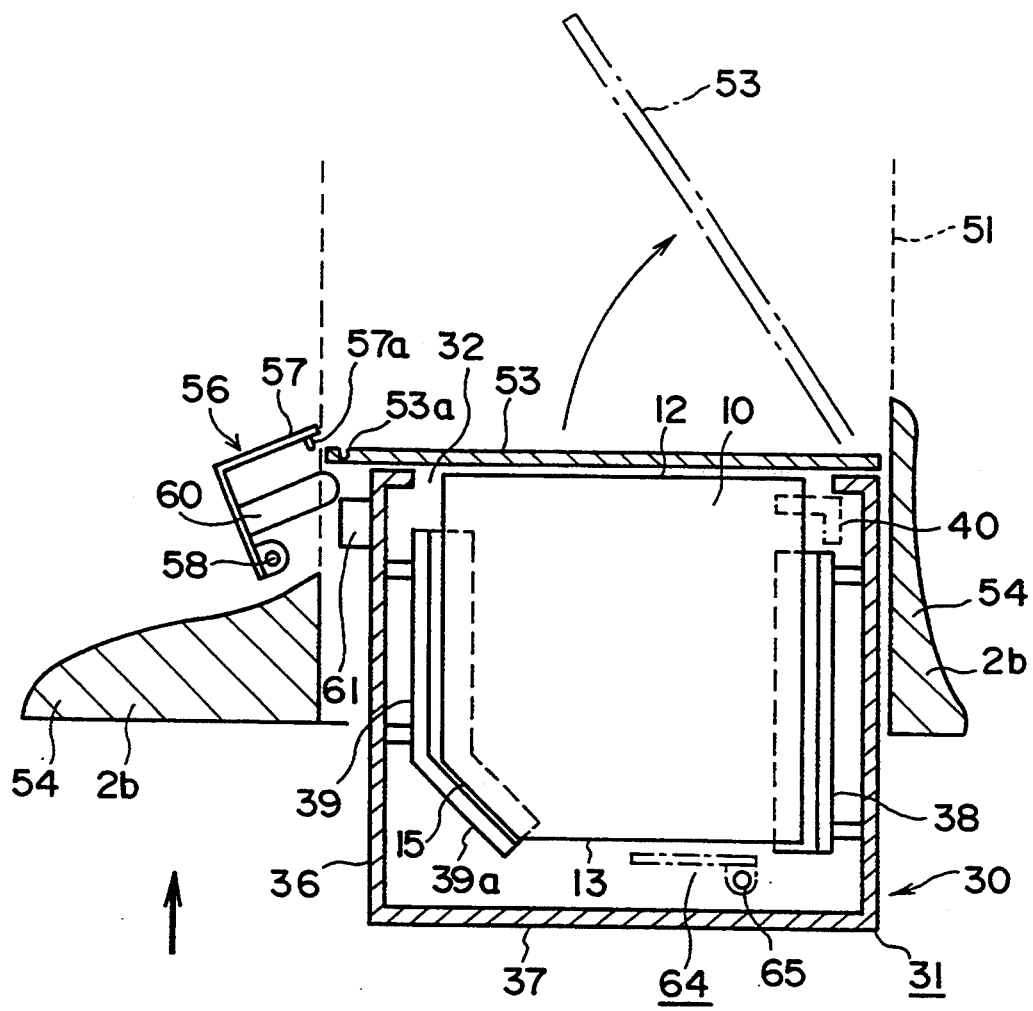
FIG. 8 is a sectional view of the essential portions of the cartridge library apparatus of the embodiment showing the state of the apparatus immediately before the magazine loaded with cartridges in a correct direction is set in the magazine rack.

In each pair of brackets 38 and 39, the bracket 39 mounted on the other side wall 36 has its end portion closer to the rear wall 37 of the magazine body 31 bent at an angle of, for example, 45° within a horizontal plane. The bent portion 39a functions as an erroneous insertion restraint portion. More specifically, when the cartridge 10 has been inserted into the magazine 30 erroneously with the slotted front wall 12 facing the deep side of the magazine body 31 and the rear wall 13 facing outwards as shown in FIG. 7, the erroneous insertion restraint portion 39a is struck by the right-angled corner of the cartridge 10 defined by the front wall 12 and side wall 16 thereof, and it obstructs the cartridge 10 from advancing more and causes the cartridge 10 to project in front of the magazine 30. In contrast, when the cartridge 10 has been inserted into the magazine 30 correctly with the front wall 12 facing outwards and the rear wall 13 facing inwards as shown in FIG. 8, the bent portion 39a comes into close contact with the slant 15 of the cartridge 10, and it does not cause the cartridge 10 to project from the magazine 30.

Figure 9:
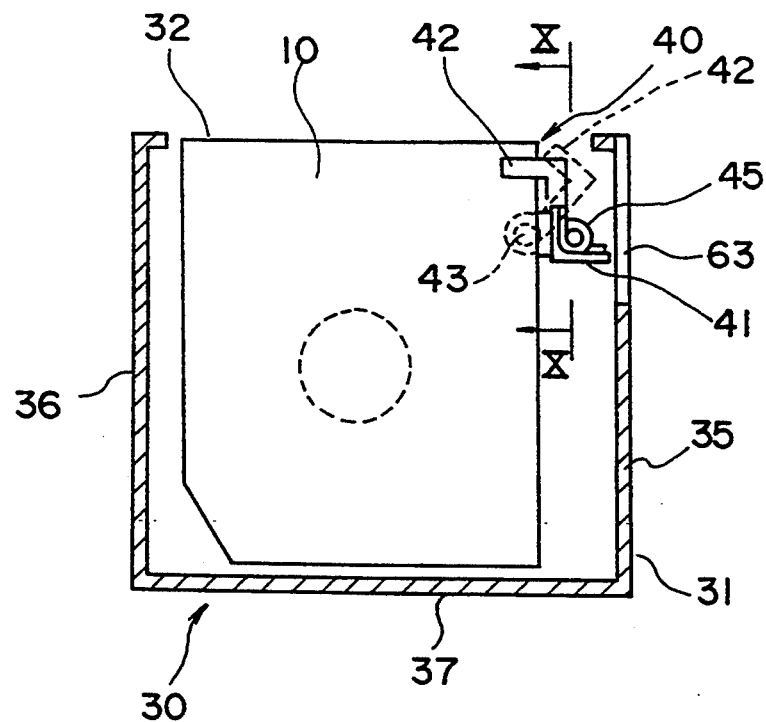
FIG. 9 is a top plan view of a cartridge lock mechanism which is included in the embodiment of the present invention.
Figure 10:
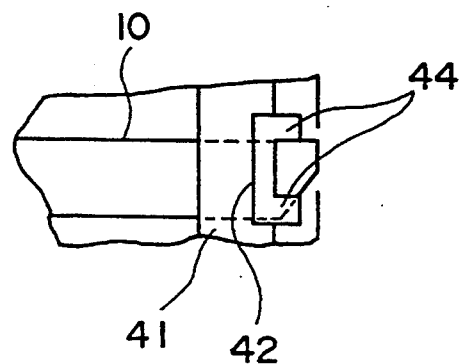
FIG. 10 is a fragmentary view taken along line X—X which is indicated in FIG. 9.

Further, the magazine 30 has built-in mechanisms each of which locks the corresponding cartridge 10 so as not to come out when this cartridge 10 has been loaded formally or properly. As indicated by reference numeral 40 in FIG. 7, the lock mechanism is arranged in an interspace defined between the side wall 35 of the magazine 30 and the ends of the brackets 38, 39 facing the opening 32 of the magazine 30. As shown in FIG. 9, the lock mechanism 40 itself includes a shaft member 41 and a pawl member 42. The shaft member 41 penetrates the aforementioned interspace vertically. Shafts 43 set t both ends of the shaft member 41 are kept in journal bearings which are respectively held in the top wall 33 and bottom wall 34 of the magazine 30. The pawl member 42 serves to lock the corresponding cartridge 10 which is held by the pair of brackets 38 and 39. More specifically, as shown in FIG. 10, the pawl member 42 has one end formed into pawls 44, 44 which are located at an interval relating to the thickness of the cartridge 10, and it has the other end fixed to the shaft member 41. Referring back to FIG. 9, a helical spring 45 is wound round a shaft arranged parallel to the shaft 43 and are fixed to the top wall 33 and bottom wall 34. One end of the helical spring 45 is retained on the shaft member 41, while the other end thereof is retained on the magazine body 31. The helical spring 45 urges the pawl member 42 in the direction in which the pawls 44, 44 snugly grasp the cartridge 10. Thus, the lock mechanism 40 prevents the cartridge 10 from coming out from the magazine 30 during the transportation of the magazine 30. Meanwhile, the lock mechanism 40 is released as follows: Outside the magazine 30, the operator of the cartridge library apparatus presses a lever, not shown, which extends from the shaft member 41 to the exterior of the magazine 30 through the magazine body 31, so as to reverse the shaft member 41 against the urging force of the helical spring 45. Then, the pawl member 42 is withdrawn from the cartridge 10 as indicated by a broken line in FIG. 9.

Still further, as shown in FIG. 6, the magazine 30 has handles 46 and 47 attached to the top wall 33 and the side wall 35 constituting the magazine body 31, respectively. Each of the handles 46 and 47 is U-shaped, and is mounted on the magazine body 31 by pins. When turned about the pin, each of the handles 46 and 47 can be switched-over between a withdrawal position indicated by a solid line in FIG. 6 and a service position indicated by a broken line. The magazine body 31 is formed with dents 48, 49 in which the respective handles 46, 47 are fitted; and the pins which serve as the turning axes of the respective handles 46, 47 are arranged inside the dents 48, 49. Thus, when withdrawn, the handles 46 and 47 are prevented from jutting out beyond the outer planes of the magazine body 31.

The operation of loading the magazine 30 with the cartridges 10 is performed as follows: First, that unshown lever of the lock mechanism 40 which is located sideward of the magazine 30 is turned outside the magazine 30, to bring the pawl member 42 into the withdrawn state as indicated by the broken line in FIG. 9. Subsequently, in this state, the cartridge 10 is inserted between the pair of brackets 38 and 39 so as to be supported by these brackets. On this occasion, when any of the inserted cartridges 10 lies in the erroneous loading direction, the right-angled corner of the cartridge 10 collides against the bent portion (the erroneous insertion restraint portion) 39a of the bracket 39 as explained with reference to FIG. 7, so that the cartridge 10 cannot be completely loaded in the magazine 30. Since, in this manner, the cartridge 10 loaded in the erroneous direction protrudes from the magazine 30, the operator of the apparatus can immediately notice the error of the loaded state. Further, when all the cartridges 10 have been loaded in the magazine 30 in the predetermined correct direction, the lever of the lock mechanisms 40 extending out of the magazine 30 is restored. Then, as indicated by a solid line in FIG. 9, the pawls (44 in FIG. 10) of the respective pawl members 42 grasp the side surfaces of the corresponding cartridges 10 so as to hinder the cartridges 10 from slipping out of the magazine 30.

Each of the magazines 30 is set in the magazine rack 2b. In moving the magazine 30 to the magazine rack 2b, the operator of the apparatus can carry the magazine body 31 by the handle 46 (shown in FIG. 6). Also in setting the magazine 30 in the rack 2b, the attitude of the magazine 30 can be stabilized for the easy insertion thereof into the rack 2b in such a way that, while grasping the handle 46 in one hand, the operator holds the handle 47 with the other hand. As stated above, even during the course of the movement of the magazine 30, the pawl members 42 of the lock mechanisms 40 hinder the cartridges 10 from slipping out. Therefore, even when the magazine 30 is subjected to mechanical shocked during the transportation, the cartridges 10 do not come out of the magazine 30 and can be prevented from breaking or being damaged.

As stated before, the magazines 30 loaded with the cartridges 10 are respectively set in the magazine rack 2b which is built in each of the main unit 21 and extension units 22. As clearly shown in FIG. 2, the magazine rack 2b assembled in the main unit 21 has the magazine accommodation portions or spaces 51 for the six magazines 30. Likewise to the main unit 21, each of the extension units 22 has magazine accommodation spaces 51 for the six magazines 30 inside a door. A slide table 52 is provided in association with each of the magazine accommodation spaces 51. The slide table 52 is placed on a rail laid in the magazine accommodation space 51. Thus, the table 52 can move between an acceptance position at which it confronts the magazine accommodation space 51 outside this space and an accommodation position at which it lies completely within the magazine accommodation space 51, so as to facilitate the insertion of the magazine 30 into the magazine accommodation space 51.

As shown in FIGS. 7 and 8, a cover member 53 is provided at that part of the magazine accommodation space 51 which is near to the outer opening (the cartridge insertion/ejection opening) 32 of the magazine 30. The cover member 53 is arranged so as to traverse and shut the magazine accommodation space 51 while leaving an open area through which only the slide table 52 can pass (refer also to FIG. 2). This cover member 53 is fixed by a shaft 55 at one side edge thereof. The shaft 55 is kept in journal bearings which are disposed in the magazine rack 2b. This shaft 55 is spring-biased in a direction from the open state (indicated by a dot-and-dash line in FIG. 8) in which the free end of the cover member 53 lies on the deep side of the magazine accommodation space 51, toward the closed state (indicated by a solid line in FIG. 7 or FIG. 8) in which the cover member 53 traverses the magazine accommodation space 51. A latch mechanism 56 serves to hold the cover member 53 in the closed state mentioned above, and it includes a stopper 57, a shaft 58 and an arm 60. The stopper 57 is substantially L-shaped when viewed from above, and its part corresponding to one leg of the letter L is fixed to the shaft 58. Thus, the stopper 57 can turn about the shaft 58 so as to switch-over between its position (shown in FIG. 7) which holds the cover member 53 in the closed state and its position (shown in FIG. 8) which retreats from the cover member 53 and which permits the cover member 53 to be brought into the open state. As best shown in FIG. 8, a salience 57a is formed at the distal end part of the other leg of the L-shaped stopper 57, while a recess 53a into which the salience 57a of the stopper 57 can be snugly fitted is formed in the free end part of the cover member 53. The shaft 58 has both its ends held in bearings disposed in the magazine rack 2b, and it is normally urged by a spring (not shown) to a position at which the stopper 57 holds the cover member 53 in the closed state. The arm 60 is fixed to the stopper 57, and it extends to the vicinity of the side wall 36 of the magazine 30 set in the magazine accommodation space 51. On the other hand, a lug 61 is erected on that outer surface of the side wall 36 of the magazine body 31 which is opposite to the arm 60. The lug 61 pushes the arm 60 on the stopper 57 and turns this stopper 57 when the magazine 30 in which all the cartridges 10 are loaded in the formal or proper direction is intended to be set in the magazine accommodation space 51.

As seen from FIG. 7, in the case where the cartridge 10 has been inserted into the magazine 30 in the erroneous direction, it is not completely loaded in the magazine 30 as stated before. Even when the magazine 30 containing the cartridge 10 located in the erroneous direction is intended to be inserted into the magazine rack 2b, the cover member 53 is kept in the closed state, and the magazine 30 is not completely set in the magazine accommodation space 51. More specifically, in the state in which the salience 57a of the stopper 57 is fitted in the recess 53a of the cover member 53, this cover member 53 is not brought into the open state even when the closed cover member 53 is pushed by the cartridge 10 projecting beyond the front face 32 of the magazine 30.

In contrast, as seen from FIG. 8, in the case where the magazine 30 in which all the cartridges 10 are loaded in the formal direction is intended to be inserted into the magazine rack 2b, the lug 61 of the magazine 30 strikes and then pushes the arm 60 of the latch mechanism 56 and turns the stopper 57 about the shaft 58, so that the cover member 53 is switchably opened. Subsequently, when the magazine 30 is pushed or inserted still further, it pushes the cover member 53 to bring this cover member into the open state. Finally, the magazine 30 is set in the magazine accommodation space 51.

As can be understood from the above, the cover member 53 is not opened merely by pushing it. Therefore, even if somebody tries to thrust a hand into the magazine accommodation space 51, the cover member 53 obstructs the hand from entering the magazine accommodation space 51, so that it is not hurt by the transport device 80.

Figure 11:
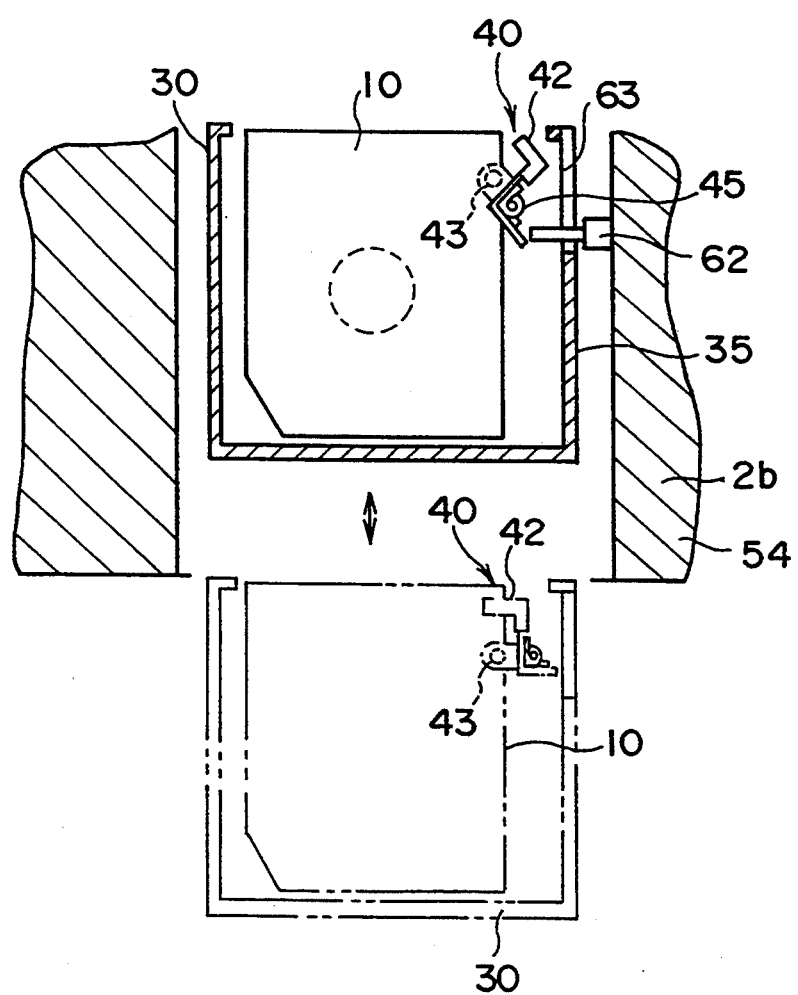
FIG. 11 is an explanatory view showing the operation of the cartridge lock mechanism.

When the magazine 30 has been set in the magazine rack 2b, the mechanisms 40 locking the respective cartridges 10 in the magazine 30 are released. An unlocking mechanism for releasing the lock mechanisms 40 includes a rod member which is indicated by reference numeral 62 in FIG. 11. The rod member 62 is arranged on and fixed to the rack body 54 of the magazine rack 2b so as to turn the shaft members 41 of the lock mechanisms 40 when the magazine 30 loaded with all the cartridges 10 in the formal direction has been set in the magazine accommodation space 51 of the magazine rack 2b. A cutaway portion 63 for passing the rod member 62 therethrough is provided in the side wall 35 of the magazine 30.

Figure 12:
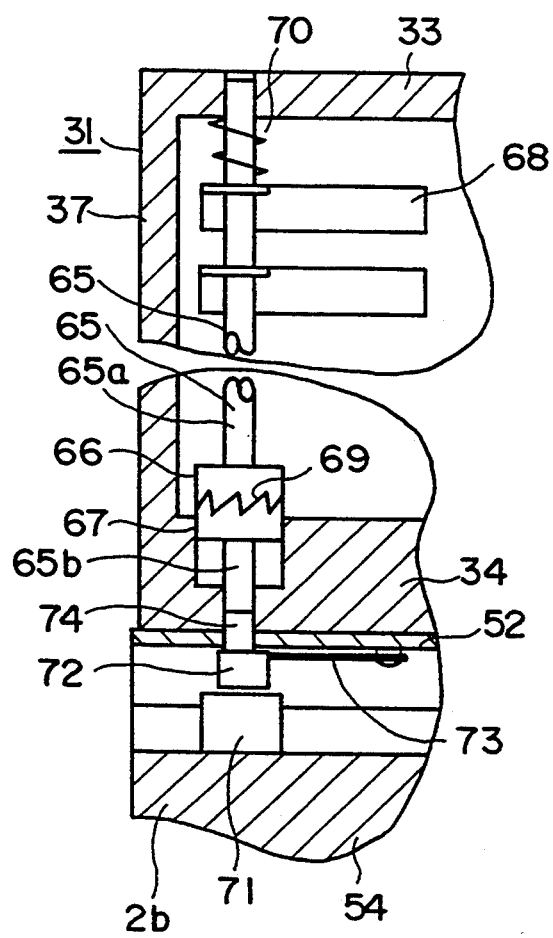
FIG. 12 is a sectional view taken along line XII—XII which is indicated in FIG. 7.

Further, the cartridge library apparatus includes a cartridge detection mechanism which can automatically detect the fact that quite no cartridge 10 is loaded in the set magazine 30, when the magazine 30 has been set in the magazine rack 2b. The cartridge detection mechanism is generally indicated by numeral 64 in FIGS. 7 and 8, and it is arranged in a space near to the rear wall 37 within the magazine 30. As shown in FIG. 12, the mechanism 64 itself includes a shaft 65, elevation members 66, 67 and arms 68. The shaft 65 is arranged in a space which is defined among the rear wall 37, the side walls 35 and 36, and the end parts of the brackets 38 and 39 facing the rear wall 37. In addition, this shaft 65 has both its ends inserted in through holes which are respectively formed in the top wall 33 and bottom wall 34 of the magazine body 31, and it is thus turnable. It consists of two portions; an upper shaft portion 65a and a lower shaft portion 65b. The elevation members 66 and 67 are respectively fixed to the lower part or bottom of the upper shaft portion 65a and to the upper part or top of the lower shaft portion 65b, and they are held in mesh engagement with each other by teeth 69. Incidentally, the lower shaft portion 65b is made vertically slidable. The number of arms 68 is equal to the number of pairs of brackets 38 and 39. The base end of each of the arms 68 is mounted on the upper shaft portion 65a, while the free end or distal end thereof lies in the cartridge loading subspace between the adjacent pairs of brackets 38 and 39. Besides, a coiled spring 70 is fitted round the upper shaft portion 65a of the shaft 65, and it has one end retained by the magazine body 31 and the other end by the upper shaft portion 65a. This coiled spring 70 urges the arms 68 in a direction from positions which are indicated by a dot-and-dash line in FIG. 7, toward positions at which the free ends of these arms intrude into the cartridge loading subspaces as indicated by a solid line.

Figure 13:
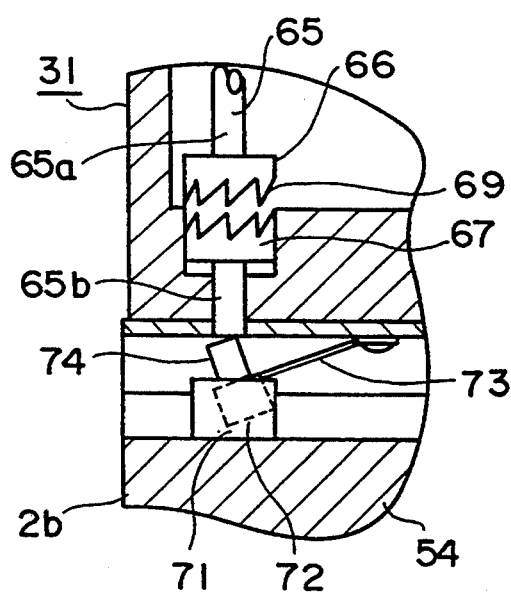
FIG. 13 is an explanatory view showing the operation of a cartridge detection mechanism which is included in the embodiment of the present invention.

According to the cartridge detection mechanism 64, whenever at least one cartridge 10 is loaded in the magazine 30, the arms 68 are hindered from turning by the rear wall 13 of the cartridge 10, as seen from FIG. 8, and the elevation members 66 and 67 are in mesh. In contrast, when no cartridge 10 is loaded in the magazine 30, the arms 68 are turned by the coiled spring 70, and the elevation member 66 is turned along with the upper shaft portion 65a. Then, as shown in FIG. 13, the teeth 69 of the elevation member 66 ascend on those 69 of the other elevation member 67, and the lower shaft portion 65b slides downwards until its lower end protrudes from the magazine 30.

A mechanism for detecting the protrusive state of the lower shaft portion 65b is built in the rack body 54. This mechanism includes a photosensor 71 and a shutter 72. The photosensor 71 is fixed to the rack body 54 at a position under the through hole which is formed in the bottom wall 34 of the magazine 30 and into which the lower shaft portion 65b is fitted. As is clearly shown in FIG. 12, the shutter 72 is supported by the free end or distal end of an arm 73 which has its base end fixed to the rack body 54. A guide piece 74 is mounted on that surface of the arm 73 which is opposite the surface thereof carrying the shutter 72. The arm 73 itself is made of an elastic material. It exerts a biasing force in the direction of withdrawing the shutter 72 from the interspace between a light source and a light receiver in the photosensor 71 and fitting the guide piece 74 into the through hole of the bottom wall 34.

When the magazine 30 set in the magazine rack 2b is loaded with at least one cartridge 10, the lower shaft portion 65b does not protrude out of the magazine 30, and hence, the shutter 72 lies outside the interspace between the light source and the light receiver in the photosensor 71. In contrast, when the magazine 30 is not loaded with any cartridge 10 at all, the lower shaft portion 65b of the shaft 65 protrudes from the body 31 of the magazine 30 as shown in FIG. 13. Consequently, the guide piece 74 is depressed by the lower shaft portion 65b, and the arm 73 is flexed until the shutter 72 intercepts a light beam emitted from the light source toward the light receiver in the photosensor 71. Therefore, in a case where the photosensor 71 is electrically connected to the controller of the transport device 80 by way of example, a warning can be issued to the operator of the apparatus on the basis of a signal delivered from the photosensor 71, and the idle access of the transport device 80 which would otherwise ensue can be prevented.

According to the present invention, a large number of cartridges of magnetic tape can be accommodated in a rack at one time by loading them into a magazine, so that the labor of the operator of a cartridge library apparatus can be relieved.

Moreover, in a case where the direction of loading any of the cartridges into the magazine is erroneous, an erroneous insertion restraint portion functions to project part of the cartridge from the magazine without inserting this cartridge completely into a cartridge accommodation subspace. Therefore, the operator can check whether the loaded state of each cartridge is correct or erroneous, before setting the magazine in the rack.

What is claimed is:

1. A cartridge library apparatus having racks each of which accommodates a plurality of cartridges therein, each of the cartridges being so constructed that a magnetic tape is encased in a container and that a tape drawing-out slot is formed in a face of the container opposing one face thereof; a magnetic tape drive unit which, at least, reads contents of the magnetic tape; and a transport mechanism which transports the cartridge between the magnetic tape drive unit and the rack; comprising:

magazines each of which can be loaded with the plurality of cartridges;

each of said magazines being formed with a cartridge accommodation space in which said plurality of cartridges are accommodated, and a cartridge insertion/ejection opening through which said cartridges are put into and out of said cartridge accommodation space from outside the magazine, and being provided with erroneous insertion restraint portions each of which allows the corresponding cartridge to be completely accommodated in said cartridge accommodation space when said cartridge is intended to be inserted from said one face of said container in case of inserting said cartridge into said cartridge accommodation space through said cartridge insertion/ejection opening, whereas it prevents said cartridge from being completely inserted into said cartridge accommodation space when said cartridge is intended to be inserted from any position thereof other than said one face of said container;

at least one of said racks constructing a magazine rack which accommodates said magazines therein, and which is formed with cartridge insertion/ejection ports for putting said cartridges into and out of said magazine rack, on its side near said transport mechanism, and magazine holes for, at least, inserting said magazines into said magazine rack from outside, on its side opposite said cartridge insertion/ejection ports, wherein said magazine rack comprises covers, each of which covers is switchable between a closed state shutting up the corresponding magazine hole and an open state allowing said magazine to be inserted through said magazine hole and latch mechanisms each of which latch mechanisms holds the corresponding cover in said closed state and releases the holding of said closed state of said cover when said magazine is intended to be inserted through said magazine hole in the state where said cartridge is completely accommodated in said cartridge accommodation space of said magazine, whereas it does not release said holding of said closed state of said cover even when said magazine is intended to be inserted through said magazine hole in the state where said cartridge is not completely accommodated in said accommodation space of said magazine.

2. A cartridge library apparatus as defined in claim 1, wherein:

said magazine comprises cartridge lock mechanisms each of which cartridge lock mechanisms constrains the corresponding cartridge in said cartridge accommodation space so as to prevent said cartridge from coming out of said magazine hole, in said state where said cartridge is completely accommodated in said cartridge accommodation space; and said magazine rack comprises unlocking mechanisms each of which unlocking mechanisms releases the constraint of said cartridge by the cartridge lock mechanism when said magazine has been accommodated in said magazine rack.

3. A cartridge library apparatus as defined in claim 2, wherein said magazine is provided with a handle at least at an upper end part thereof.

4. A cartridge library apparatus as defined in claim 1, wherein:

said magazine includes a cartridge detection mechanism which is entirely concealed in said magazine when any of said cartridges is accommodated in said cartridge accommodation space, and part of which protrudes out of said magazine when none of said cartridges is accommodated in said cartridge accommodation space; and said magazine rack includes a sensor which detects said part of said cartridge detection mechanism protruding out of said magazine.

5. A cartridge library apparatus as defined in claim 1, wherein said magazine comprises a cartridge detection mechanism which is entirely concealed in said magazine when any of said cartridges is accommodated in said cartridge accommodation space, and part of which protrudes out of said magazine when none of said cartridges is accommodated in said cartridge accommodation space; and said magazine rack comprises a sensor which detects said part of said cartridge detection mechanism protruding out of said magazine.

6. A cartridge library apparatus as defined in claim 1, wherein said magazine is provided with a handle at least at an upper end part thereof.

7. A cartridge library apparatus having racks each of which accommodates a plurality of cartridges therein, each of the cartridges being so constructed that a magnetic tape is encased in a container and that a tape drawing-out slot is formed in a face of the container opposing to one face thereof; a magnetic tape drive unit which, at least, reads contents of the magnetic tape; and a transport mechanism which transports the cartridge between the magnetic tape drive unit and the rack; comprising:

magazines each of which can be loaded with the plurality of cartridges;

each of said magazines being formed with a cartridge accommodation space in which said plurality of cartridges are accommodated, and a cartridge insertion/ejection opening through which said cartridges are put into and out of said cartridge accommodation space from outside the magazine, and being provided with erroneous insertion restraint portions each of which allows the corresponding cartridge to be completely accommodated in said cartridge accommodation space when said cartridge is intended to be inserted from said one face of said container in case of inserting said cartridge into said cartridge accommodation space through said cartridge insertion/ejection opening, whereas it prevents said cartridge from being completely inserted into said cartridge accommodation space when said cartridge is intended to be inserted from any position thereof other than said one face of said container;

at least one of said racks constructing a magazine rack which accommodates said magazines therein, and which is formed with cartridge insertion/ejection ports for putting said cartridges into and out of said magazine rack, on its side near said transport mechanism, and magazine holes for, at least, inserting said magazines into said magazine rack from outside, on its side opposite said cartridge insertion/ejection ports, wherein said magazine comprises cartridge lock mechanisms each of which cartridge lock mechanisms constrains the corresponding cartridge in said cartridge accommodation space so as to prevent said cartridge from coming out of said magazine hole, in the state where said cartridge is completely accommodated in said cartridge accommodation space, and a cartridge detection mechanism which is entirely concealed in said magazine when any of said cartridges is accommodated in said cartridge accommodation space, and part of which protrudes out of said magazine when none of said cartridges is accommodated in said cartridge accommodation space; and said magazine rack comprises unlocking mechanisms each of which unlocking mechanisms releases the constraint of said cartridge by the cartridge lock mechanism when said magazine has been accommodated in said magazine rack, and a sensor which detects said part of said cartridge detection mechanism protruding out of said magazine.

8. A cartridge library apparatus as defined in claim 7, wherein said magazine is provided with a handle at least at an upper end part thereof.

* * * * *